United States Patent [19]
Hildenbrand

[11] Patent Number: 5,878,246
[45] Date of Patent: Mar. 2, 1999

[54] SYSTEM FOR LINKING AN INTERPOSITION MODULE BETWEEN TWO MODULES TO PROVIDE COMPATIBILITY AS MODULE VERSIONS CHANGE

[75] Inventor: Bruce E. Hildenbrand, Mountain View, Calif.

[73] Assignee: Sun Microsystems, Inc., Palo Alto, Calif.

[21] Appl. No.: 498,366

[22] Filed: Jul. 5, 1995

[51] Int. Cl.$^6$ .............................. G06F 13/00; G06F 13/14
[52] U.S. Cl. .......................... 395/500; 395/836; 395/882; 395/707
[58] Field of Search .................................... 395/707, 500, 395/681, 836, 882, 200.02, 200.2, 200.11, 200.12, 200.51

[56] References Cited

U.S. PATENT DOCUMENTS

| Re. 35,050 | 10/1995 | Gibbs et al. | 379/93 |
|---|---|---|---|
| 4,315,310 | 2/1982 | Bayliss et al. | 364/200 |
| 4,875,186 | 10/1989 | Blume, Jr. | 364/900 |
| 4,897,799 | 1/1990 | Le Gall et al. | 364/514 |
| 5,179,690 | 1/1993 | Ishikawa | 395/500 |
| 5,317,722 | 5/1994 | Evans | 395/500 |
| 5,335,341 | 8/1994 | Chana | 395/575 |
| 5,381,530 | 1/1995 | Thayer et al. | 395/275 |
| 5,469,494 | 11/1995 | Ortiz Perez et al. | 375/27 |
| 5,517,635 | 5/1996 | Cross et al. | 395/500 |
| 5,555,418 | 9/1996 | Nilsson et al. | 395/700 |
| 5,564,110 | 10/1996 | Ueda | 395/828 |
| 5,724,590 | 3/1998 | Goettelmann et al. | 395/707 |

Primary Examiner—Thomas C. Lee
Assistant Examiner—Rehana Perveen
Attorney, Agent, or Firm—McDermott, Will & Emery

[57] ABSTRACT

Apparatus that provides additional flexibility for a computer interface that serves two computer subsystems, when at least one of these subsystems undergoes a change, such as a new version, a change in subsystem functionality, or fixing of a "bug." An interposer, positioned between a first interface for a first computer subsystem and a second subsystem interface for a second computer subsystem, monitors command or data request signals and response signals generated in the first subsystem and passing to the second subsystem through the second subsystem interface and tests these signals for recognition by, consistency with and compatibility with, the second subsystem, given the change(s) that have been made in the first computer subsystem. If non-recognition, inconsistency or incompatibility of these signals is present, the interposer advises the first computer subsystem and/or the first interface of any changes that should be made in the command signal parameters to improve the recognition, consistency or compatibility of this command signal. Where possible, the interposer provides default values for these command signal parameters that enhance the recognition, consistency and/or compatibility of the command signal. A second interposer, positioned between the second interface and the first interface, performs similar tasks for a command signal generated and transmitted by the second computer subsystem to the first computer subsystem.

23 Claims, 7 Drawing Sheets

SYSTEM FOR LINKING AN INTERPOSITION MODULE BETWEEN TWO MODULES TO PROVIDE COMPATIBILITY AS MODULE VERSIONS CHANGE

FIELD OF THE INVENTION

This invention relates to monitoring communication between two or more computer modules or systems by supplementing the computer module-computer module interface with an interposition module that monitors and tests all function calls.

BACKGROUND OF THE INVENTION

Whenever two computer modules or two computer systems communicate with each other, miscommunication is a real possibility. The formats used by each computer for file names, data, commands and other quantities of interest may differ markedly. The range and/or data type of alphanumeric variables or logical variables exchanged, used or processed by each computer may be inconsistent with each other. The number of arguments requested by one computer module or system (the "consumer") and provided by the other computer module or system (the "producer") may not agree. These are a few of the many inconsistencies that may prevent the modules or systems from communicating with each other. Further, if one, or both, of the communicants is replaced by a new, enhanced or merely updated version, miscommunication may be an unwelcome byproduct of the new arrangement. If the two communicating computers or modules are designed and assembled by different companies, or even by different divisions of a single company, the problem of communication is even more complex.

Two computer modules or systems (referred to here as computer "subsystems" for convenience) normally communicate (exchange data, commands, control signals, etc.) by means of an interface that, in theory, provides a translation between the internal environments of the two subsystems. The interface may be constructed as part of one or the other of the subsystems or may be a separate entity that receives and translates commands, control signals and/or data from each subsystem into commands, control signals and/or data usable by the other subsystem. Where two subsystems work cooperatively on a common task, the interface plays a critical role. Because of this, it is important to provide an approach for evaluating the implementation of the interface, for monitoring the proper functioning of the interface, and for testing the valid use of the interface. Attributes, such as the number of data arguments, the data types and ranges of the arguments, and the formats required for command, or control signals, should be checked for compatibility and consistency when a consumer subsystem calls for data or other information from a producer subsystem.

With the passage of time, an interface may require changes, due to addition of new functionality, removal of unneeded or inconsistent functionality, performance enhancements, fixing of bugs and many other natural developments in the evolution of a computer subsystem. When the interface, or consumer or producer, changes but the interface can still provide communication between the consumer and the producer, the present interface is said to be "compatible." Otherwise, the interface is said to be "incompatible," and further changes may be required for continued communication. Compatibility allows an older version of software in one computer subsystem to work with a newer version of software in a communicating subsystem, without recoding or recompiling, and is thus desirable.

Other workers have provided interface features that enhance the role of the interface. Yanes, in U.S. Pat. No. 5,202,998, discloses a multiprocessor system in which each processor has an associated interface circuit and register for a status flag. Each interface circuit receives update messages from other interface circuits from time to time, and corresponding flag bits are changed, using an algorithm that does not require these status changes to follow a predetermined protocol or be recognized in a particular order.

A testing system that determines the health or operational status of a computer system is disclosed in U.S. Pat. No. 5,210,757, issued to Barlow et al. The computer system performs a short, high priority sequence of operations that require use of a bus interface. The testing system compares the results of this sequence with corresponding ideal results to determine if use of this bus interface has any effect on the computer system being tested. The computer system is determined to be operational, non-operational or of questionable operability, depending upon comparison of the real and ideal results.

U.S. Pat. No. 5,265,243, issued to Povenmire et al, discloses a flexible, all-purpose interface controller that provides an interface between a central processor and each of a plurality of peripheral I/O devices. The interface controller contains arrays of NAND gates and NOR gates that can be configured differently for each different peripheral device, and is especially useful in ASIC applications.

Friedrich et al disclose an interface for a dynamically reconfigurable computer system tester, useful for modeling and testing different processes performed by the computer, in U.S. Pat. No. 5,276,877. The computer system is configured for and performs a selected process, using selected input parameters, and certain output parameters or metrics are examined to evaluate computer performance for this process.

A computer subsystem communication system, including a bus and bus interface for each subsystem, is disclosed by Boasson in U.S. Pat. No. 5,301,339. Relying on the interactions of the bus interfaces, each subsystem may call for and receive specified information of a particular data type, without specifying the particular subsystem in which the specified information of specified data type is found.

Pio-di-Savoia et al disclose a generator of auto-checking testing functions for a software interface in U.S. Pat. Nos. 5,357,452 and 5,359,546. Where proper behavior of the software interface can be adequately described by its formal specification (semantic expressions, pre- and post-execution conditions), a testing function is automatically generated and used to evaluate the interface and to identify any exceptions for normal execution.

U.S. Pat. No. 5,379,386, issued to Swarts et al, discloses a microchannel interface controller in integrated circuit form that controls, but does not do substantial testing on, high speed transfer of data and control signals between a Micro Channel bus, a local processor and a dedicated local bus in a master-slave environment. Testing is primarily concerned with error detection and reporting.

Sheth et al disclose an I/O Module interface for multiple computers attached to a dual system bus in U.S. Pat. No. 5,386,517. This interface provides a means of communication and data/control signal transfer with a sub-requestor bus that connects a plurality of sub-requestor modules, usually computer peripherals, each with its own data protocols and clock rates. This IO Module interface tailors or translates the data and control signals so that the main host and processors are not burdened with these overhead tasks. When a sub-requestor module or a main host processor changes, a new I/O Module interface would apparently be required.

A platform for performing off-station verification and integration of an Automatic Test Program Generation test program is disclosed in U.S. Pat. No. 5,390,194, issued to Mannle. This platform oversees initial integration of a test program, including simulation of a selected set of situations on a plurality of digital circuit boards to be tested. Continued use of this platform to monitor and test interface operation after the initial testing is not disclosed.

In U.S. Pat. No. 5,392,209, Eason et al disclose an interface system for providing a data interface between a plurality of biological testing instruments and a central database. The system includes a master rules file for analyzing the format and type of test data that are presented. The system can integrate test data that are received in fragments. If a new test instrument is added, or if an old test instrument is changed substantially, it appear that a new interface system would be provided.

Barrington et al, in U.S. Pat. No. 5,394,540, disclose a network testing system that includes network simulator and a message processor that intercepts and examines messages between a tested network component and other network components. An intercepted message is selectively changed or deleted and its effect on network operation is observed. An interface, located between the tested component and the remainder of the network, controls the message processor and simulator.

A test mode readback system for a memory display interface is disclosed by Hoffert et al in U.S. Pat. No. 5,404,318. A selected sequence of test pixel color values, test paths for pixel processing and test modes are stored and applied to test the memory display and interface, by reading out and comparing the pixel output values produced the sequence of input commands. No compatibility testing is disclosed where a display unit configuration is changed.

U.S. Pat. No. 5,404,428, issued to Wu, discloses a computer graphics interface system for updating derived items in a view model that includes multiple coordinate systems. The interface system implements display of an acyclic graph in each of a plurality of selected coordinate systems to determine whether each of a selected group of derived item is valid, or whether one or more of these items is not valid, for each of the coordinate systems. The validity test appears to relate to the derived items, not to functioning of the interface itself.

Jessen et al disclose an interpreter for performing remote testing of a computer system, in U.S. Pat. No. 5,410,681. A first or host computer system, working from a script, issues a sequence of commands to a second or target computer system that emulates user activity on the target system. Responses and status of the target system and status of the host-target interface are monitored as each of the host system commands is issued. Compatibility of different combinations of available hardware and software is also tested.

Most of these approaches test the proper operation of a computer subsystem on one side or the other of an interface, not the proper functioning of the interface itself, nor the response of the interface to a fundamental change in the subsystem. Many of these approaches work from a pre-defined script of exercises that may not address all issues of interoperability of two computer subsystems. What is needed is a testing system that can be used together with an interface and its associated subsystems to evaluate functioning of the interface for interoperability, compatibility and consistency, when a subsystem served by the interface is changed fundamentally, by introduction of a new version, by substantial enhancement of the subsystem, or in some equivalent manner. Preferably, this testing system should provide both standard testing features and reconfigurable testing features for special purpose testing and monitoring.

SUMMARY OF THE INVENTION

These needs are met by the invention, which provides a system, called an "interposer," that can be interpositioned between a first computer subsystem (and its associated first interface) and a second computer subsystem (and its associated second interface), to monitor continued operation of one of the interfaces when that interface or the corresponding computer subsystem is changed fundamentally. Each of the subsystems can be a consumer or a producer of data in different situations. As used herein, a computer "subsystem" refers to a computer or to a module of a computer that is served by an interface between two such subsystems. A computer subsystem or interface is changed fundamentally if: (1) a new version having at least one new feature not found in the preceding version is introduced; (2) the present version of the interface/subsystem is replaced by an enhanced or modified version that contains no new features but does perform at least one subsystem process in a different manner; (3) addition of new functionality or removal of former functionality from the present version of an interface/subsystem; or (4) the present version of an interface/subsystem is enhanced by fixing or patching a software "bug" found in an application, compiler, assembler or operating system that runs on that subsystem. A consumer subsystem A requests data from a producer subsystem B, using the producer subsystem's associated interface IA/B. An interposer IPA/B, associated with the subsystem A and positioned between subsystem A and the interface IA/B associated with the subsystem B, will attempt to verify the continued proper operation of the interface IA/B, by comparing various attributes of data called for by the subsystem A and the corresponding attributes for the data that can be requested through or delivered through the interface IA/B by the subsystem B. An interposer IPB/A, associated with the subsystem B and positioned between the subsystem B and an interface IB/A associated with the subsystem A, will make analogous comparisons of data attributes; for data requested by subsystem B from subsystem A.

These data attributes include: (1) the data type of data arguments called for by subsystem A and deliverable by or through the interface IA/B; (2) the number, size and/or ordered placements of data arguments called for; (3) the ranges of the respective data arguments called for; (4) the source or location of the data called for; (5) the destination of the data called for; (6) the number and placement of command parameters in the data call; and (7) any pre-conditions that must be satisfied before this call for data can be responded to. A control signal, such as the value of a status flag or word in subsystem B, may also be called for by subsystem A, and the interposer IPA/B may also compare attributes of this control signal called for by A and deliverable by or through the interface IA/B. Subsystems A and B may have been assembled by different manufacturers; or these subsystems may be modules assembled by the same manufacturer as part of a single computer but used in a variety of combinations, not all of which are consistent with direct communication between A and B.

DETAILED DESCRIPTION OF THE PREFERRED EMBODIMENTS

Figure 1:
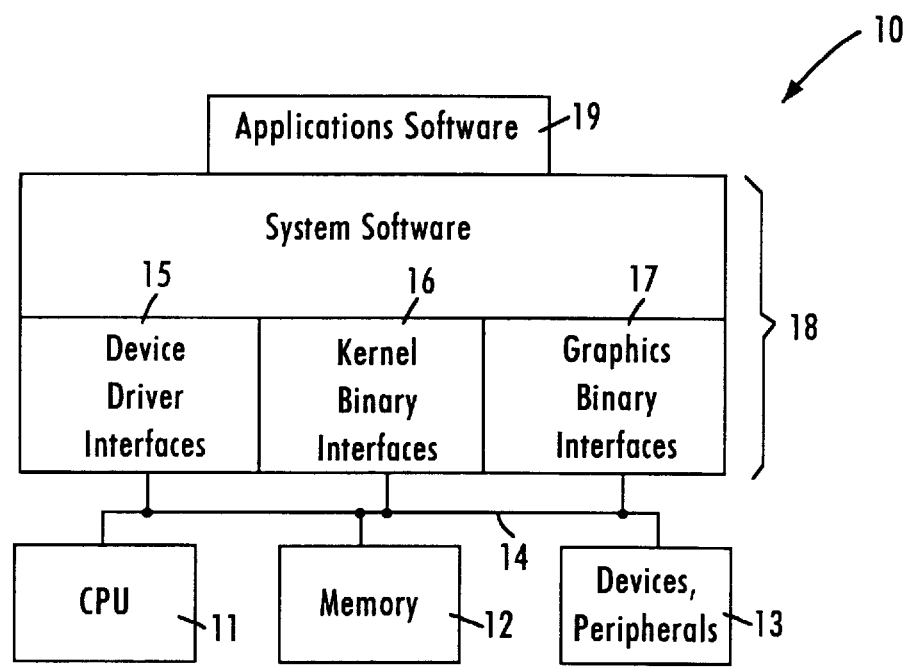
FIG. 1 is a schematic view of a computer system in which the invention can be used.

FIG. 1 illustrates a representative computer system 10 in which the invention can be used. The system 10 includes a CPU 11, associated memory 12 and associated devices 13 for input/output and internal control activities, hardware components that communicate with each other by a bus 14. A collection of device driver interfaces 15, kernel binary interfaces 16 and graphical binary interfaces 17 are part of the system software 18 of the system 10 and are connected with the hardware components and with each other by the bus 14. The system software 18 communicates with one or more applications software programs 19 that run on the system 10.

Figure 2:
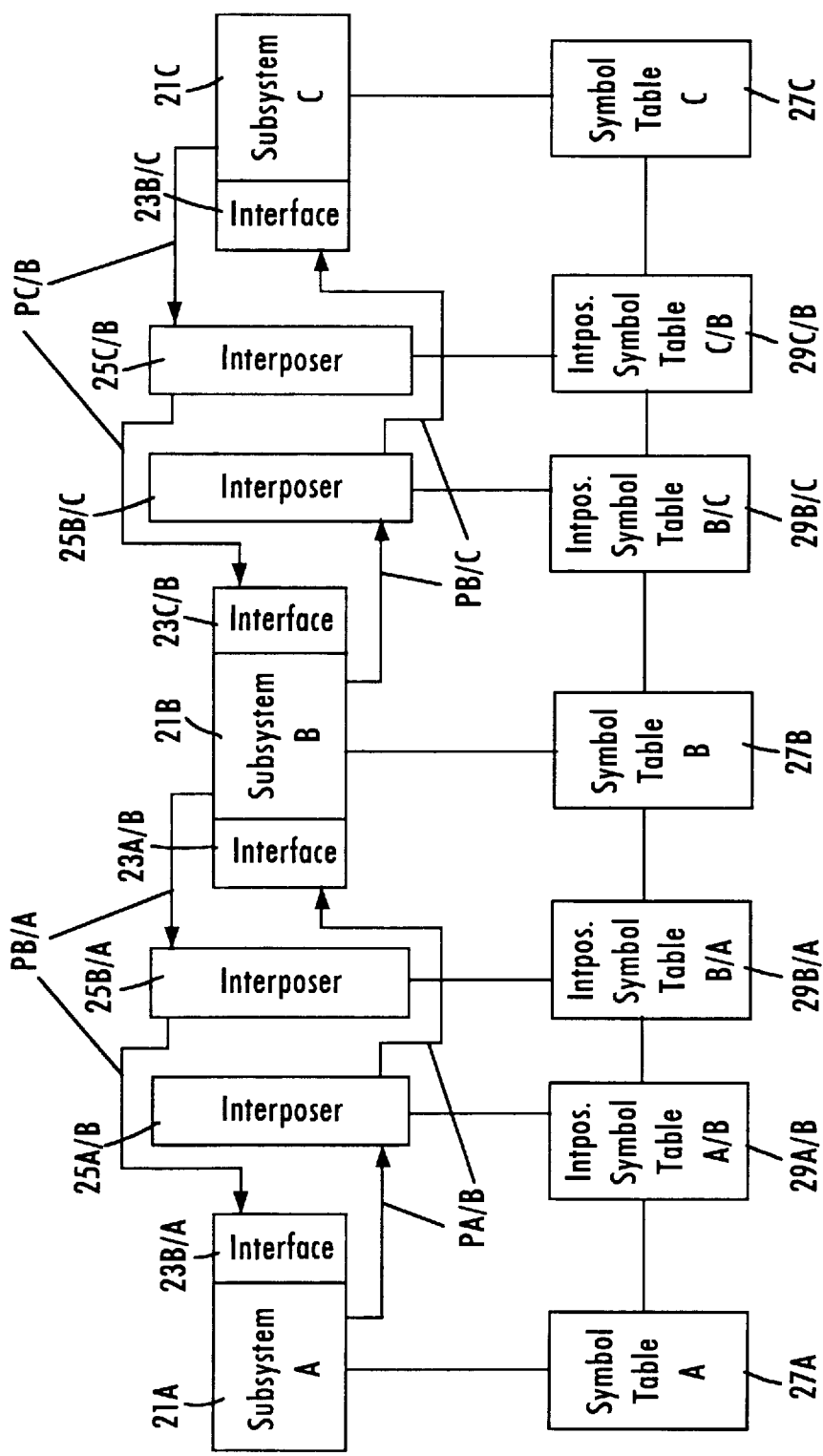
FIG. 2 is a schematic view illustrating practice of the invention for communication between three computer subsystems.

In FIG. 2, a first computer subsystem or module 21A communicates with a second computer subsystem or module 21B through a second interface 23A/B, and the second subsystem 21B communicates with the first subsystem 21A through a first interface 23B/A. One of the interfaces 23B/A and 23A/B may be deletable as unnecessary in some circumstances. The second computer subsystem or module 21B and a third computer subsystem or module 21C communicate with each other through a fourth interface 23B/C and through a third interface 23C/B, one of which may be deletable as unnecessary in some circumstances. Each of the first, second and third computer subsystems 21A, 21B and 21C may be a device driver module, a kernel binary module, a graphical binary module or any other binary module that provides an executable control program.

Communication through each interface, such as 23B/A and 23A/B, is preferably bidirectional but may be unidirectional. An interface, such as 23B/A or 23A/B, may be any of several types of interfaces. For example, a Kernel Binary Interface (KBI) provides a one-to-one relationship between a specified platform-specific computer module (PSM) and a platform-independent computer module (PIM). For example, the PSM might be created by Toshiba and the PIM might be created by SunSoft.

A first interposer 25A/B is positioned between the first computer subsystem 21A (or between the first interface 23B/A) and the second interface 23A/B, in a first path PA/B. A second interposer 25B/A is positioned between the second computer subsystem 21B (or between the second interface 23A/B) and the first interface 23B/A, in a second path PB/A.

One of the interposers 25B/A or 25A/B may be deleted, if the associated computer subsystem 21A or 21B, respectively, does riot issue calls for data and thus does not act as a consumer subsystem.

A third interposer 25B/C is positioned between the second computer subsystem 21B (or between the third interface 23C/B) and the fourth interface 23B/C, in a third path PB/C. A fourth interposer 25C/B is positioned between the third computer subsystem 21C (or between the fourth interface 23B/C) and the third interface 23C/B, in a fourth path PC/B. One of the interposers 25C/B or 25B/C may be deleted, if the associated computer subsystem 21B or 21C, respectively, does not issue calls for data and thus does not act as a consumer subsystem.

Assume that the first computer subsystem 21A, acting as a consumer, issues a call for data or control signal/status information (referred to collectively as "data" herein for convenience) from the second computer subsystem 21B, acting as a producer. Using the path PA/B, the first interposer 25A/B receives this call for data, which may specify one or more requested data attributes, such as (1) the data type of data arguments called for by the second subsystem 21B and deliverable by the first subsystem 21A; (2) the number, size (e.g., number of bits used) and/or ordered placement of data arguments called for; (3) the ranges of the respective data arguments called for; (4) the source or location (file name, memory address, data register) of the data called for; (5) the destination of the data called for; (6) the number and placement of command parameters in the data call; and (7) any pre-conditions that must be satisfied before this call for data can be responded to.

If the functionality of the second interface 23A/B or of the first computer subsystem 21A has changed fundamentally, the first subsystem 21A may deliver the requested data with one or more wrong or unrecognizable attributes, may be unable to find the requested data at the specified source, or may be unable to deliver the requested data to the specified destination, because such data are no longer presented to the interface in the expected format or at the expected place. The first interposer 25A/B receives a function call from the first subsystem 21A and consults a lookup table or similar information database for a listing of changes made in the first subsystem 21A. The first interposer 25A/B then determines if any of the changes made in the first subsystem 21A affect the data, or an attribute of the data, requested by this data call from the first subsystem 21A. The first interposer 25A/B has a listing of the relevant data attributes affected by changes made to the first subsystem 21A, and the first interposer tests and monitors the data calls that pass from the first subsystem 21A to the second subsystem 21B for compatibility with these data attribute changes and for consistency with what data are now available in the second subsystem. If changes have been made to the first subsystem 21A, the first interposer 25A/B monitors these changes and advises the first subsystem 21A of the effects of these changes.

The interposers 25B/A, 25B/C and 25C/B provide similar testing and monitoring, using the respective paths PB/A, PB/C and PC/B, for changes made in the first subsystem 21A and/or the first interface 23B/A, in the third subsystem 21C and/or the fourth interface 23B/C, and in the second subsystem 21B and/or the third interface 23C/B, respectively.

The term "interface," as used herein, refers to any part of a public specification that defines how two independent but cooperating computer subsystems interact. Several kinds of interfaces are used in connection with computer subsystems. A functional interface includes one or more subroutines that a producer subsystem exports to allow a consumer subsystem access to part or all of the functionality of the producer subsystem. A shared data interface allows two subsystems to share data and must take account of the possibility of existence of multiple versions of a shared data variable; a global variable is an example of a shared data interface. A machine interface is processor-specific and may define parameters for the representation of data, such as the size of certain data types and their respective alignments. A design interface will require a particular computer subsystem to adhere to an implementation that is global and is part of the specification; the explicit ordering of events during system initialization is an example of a design interface. A pre-condition or post-condition, defined in the specification, for execution of a command may be an interface.

An interface, such as 23A/B, is often concerned with translating a call for data or other message by a consumer or message source, such as the first computer subsystem 21A, to a format that will be understood and responded to by the producer or message recipient, such as the computer subsystem 21B, without regard to all the effects of changes made in the consumer interface or consumer subsystem. An interposer, such as 25A/B concerns itself with the effects of these changes and determines, among other things, whether (1) the data called for are now available within the producer subsystem and (2) the format in which the called data will be returned to the consumer subsystem, if such data are available within the producer subsystem. Use of the first interposer 25A/B provides compatibility to the second interface 23A/B by providing relevant information on changes and associated effects within a consumer subsystem, such as the first subsystem 21A, in attributes of data called for by the consumer subsystem. Optionally, the first interposer 25A/B also concerns itself with administrative and/or interrupt signals, to be passed through the second interface 23A/B from the first subsystem 21A to the second or third subsystem 21B or 21C without issuance of a data call. In a similar manner, the second interposer 25B/A will monitor for compatibility and test for consistency any data to be passed to the first subsystem 21A, acting as a consumer, from the second subsystem 21B, acting as a producer. If no changes have been made in a computer subsystem or its corresponding interface, such as 21A and 23A/B, the corresponding interposer, such as 25A/B, may be deleted as unnecessary.

If the first subsystem 21A, acting as a consumer, calls for data from the third subsystem 21C, acting as a producer, this data call will pass through the first subsystem 21A, the first interposer 25A/B, the second interface 23A/B, the second subsystem 21B, the third interposer 25B/C and the fourth interface 23B/C, before this data call is received by the third subsystem 21C, using the paths PA/B and PB/C. The first interposer 25A/B examines this data call for compatibility and for consistency of data attributes between the subsystems 21A and 21B. The third interposer 25B/C examines this data call for compatibility and for consistency of data attributes between the subsystems 21B and 21C. The first interposer 25A/B and/or the second interposer 25B/A address questions concerning all communications between the first and second computer subsystems 21A and 21B, including pass-through requests for data not directly available from the subsystem 21B. The third interposer 25B/C and/or the fourth interposer 25C/B address similar questions concerning all communications between the second and third computer subsystems 21B and 21C, including pass-through requests for data not directly available from the subsystem 21C. By providing a single path, such as 21A - - - 21B - - - 21C or 21A - - - 21C - - - 21B, but not both, for any data call by a consumer subsystem from a producer subsystem, this approach minimizes or eliminates the possibility that a data call passed through one path and the same data call passed through a second path will arrive at the consumer subsystem with different data requirements.

A computer subsystem or module, such as 21A, may deal with at least three types of symbols, variables or parameters (referred to as "symbols" for convenience here): a global symbol that is present in and defined/recognized in at least two computer subsystems, such as 21A and 21C; a local symbol that is present and defined/recognized only within a single subsystem; and an undefined symbol that is not defined or recognized within that subsystem so that a symbol definition must be sought in some other subsystem. A symbol, as used here, may be or refer to an interface. Each computer subsystem, such as 21A, has an associated symbol table that contains a list of all symbols used in that subsystem and a classification of each such symbol as global, local or undefined. If a symbol does not appear in the symbol table for a given subsystem, that symbol is not part of or referred to by the given subsystem. Thus, if a given subsystem seeks a definition or specification of a symbol that is undefined in the given subsystem, the given subsystem may avoid looking within any other subsystem for such definition or specification if the undefined symbol does not appear in, or appears only as an undefined symbol in, the symbol table associated with this other subsystem.

FIG. 2 indicates how a computer subsystem, such as 21A, can perform a search for the definition of an undefined symbol used within itself. If the second subsystem 21B has an undefined symbol in its symbol table 27B, the second subsystem would search "downstream" in interposer symbol tables 29B/C and 29C/B associated with the respective third and fourth interposers 25B/C and 25C/B and in a symbol table 27C associated with the subsystem 21C. The second subsystem 21B would also search "upstream" in interposer symbol tables 29B/A and 29A/B associated with the respective second and first interposers 25B/A and 25A/B and in a symbol table 27A associated with the subsystem 21A.

An interposer performs a first kind of task, testing of data calls and responses to the data calls. This testing includes checking of a command or data call for the proper data type (e.g., real number, complex number, alphanumeric value, Boolean value), proper number of data arguments, proper data argument size (number of bits requested or expected); proper numerical range of the argument(s) called for in a data call, specified location of data source within the producer subsystem, specified location of data destination within the consumer subsystem, and related attributes. Checking of these attributes may be characterized as syntax.

Interposer testing also checks or verifies that the interface that implements or formats the command has acted properly and that the proper implementation/formatting task has been performed by this interface. This testing includes, but is not limited to, (1) setting or clearing of bits in a specified database or data structure and (2) allocating or releasing a computer resource, such as a portion of memory or a CPU register. This testing may be characterized as semantics.

Interposer testing also performs pre-condition testing in order that a command can be recognized and acted upon. As an example, if a command for writing data into one or more memory addresses or registers is received, the producer subsystem to which the command is directed may require that the issuer of this command hold a page lock to obtain access to the target memory address or register, before such command can be acted upon. Interposer testing determines if (1) the command calls for the proper data type, size and numerical range, (2) the command is proper and has been acted on properly by the producer subsystem, and (3) that any pre-condition for the command is present. Interposer testing need not take any affirmative action to insure that the command can be received and acted upon by the producer subsystem. Interposer testing also maintains a log that notes each instance where a command is sent to a producer subsystem and the command cannot be acted upon because of absence of an attribute or presence of the attribute in the wrong form. This log is subsequently evaluated by a computer or by a human operator to determine what changes are required to allow commands such as these to be are received and acted upon by a producer subsystem.

An interposer performs a second kind of task, compatibility checking of a command to be received by a producer subsystem, in which the interposer may provide the appropriate attributes so that the command can be acted upon. For example, if a pre-condition is not satisfied by the command or by the consumer subsystem that issues the command, the interposer will act affirmatively to provide, if possible, the attribute(s) required so that the producer subsystem can receive and act upon the command. If the consumer subsystem does not have a required page lock for a "write" command, the interposer will attempt to obtain this page lock so that the "write" command can be responded to. If an interposer determines that a command contains an incorrect attribute, such as the wrong data type or data size or data range in a "read" or "write" command, the interposer inserts a default attribute for the incorrect attribute, where possible, to correct the command and to allow the command to be received and acted upon by the producer subsystem. For example, a command with the wrong data argument size may be corrected by insertion by the interposer of a default value for the data argument size. As another example, if a command "Read(a,b,c)" is received, where a, b and c are ordered parameters specifying source, destination and data argument size, and the new format requires a command in the form "Read(a,c,b)", the interposer will transpose the second and third arguments in this command to produce "Read(a,c,b)" as required. As another example, if a command "Write(a,b,c)" is received and the new format requires that this command have the form "Write(a,b,c,d)", the interposer will insert a default value for the fourth parameter "d" so that the command has the proper number of parameters.

Figure 3A:
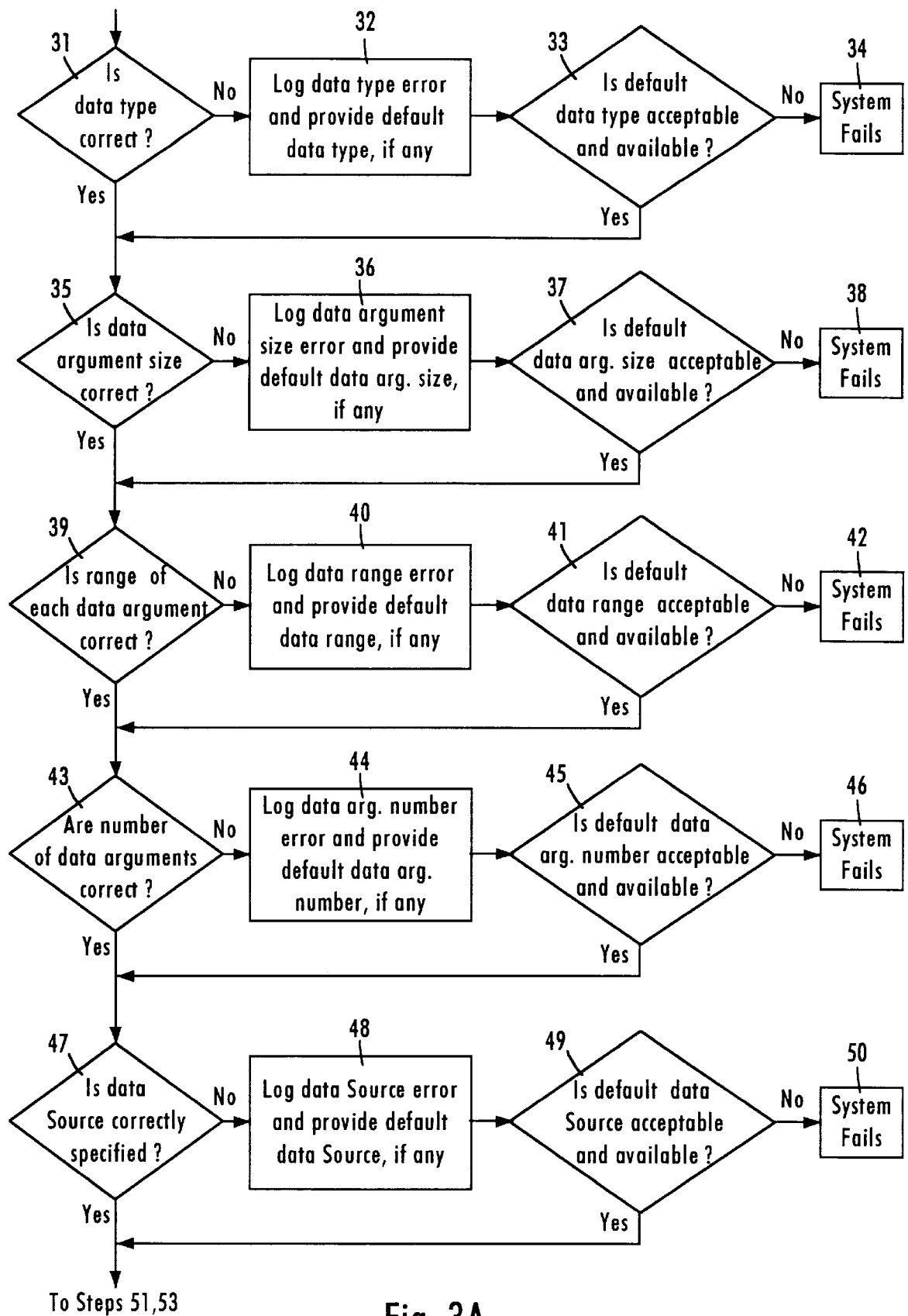
FIGS. 3A and 3B are a flow chart illustrating performance of different tasks by an interposer.
Figure 3B:
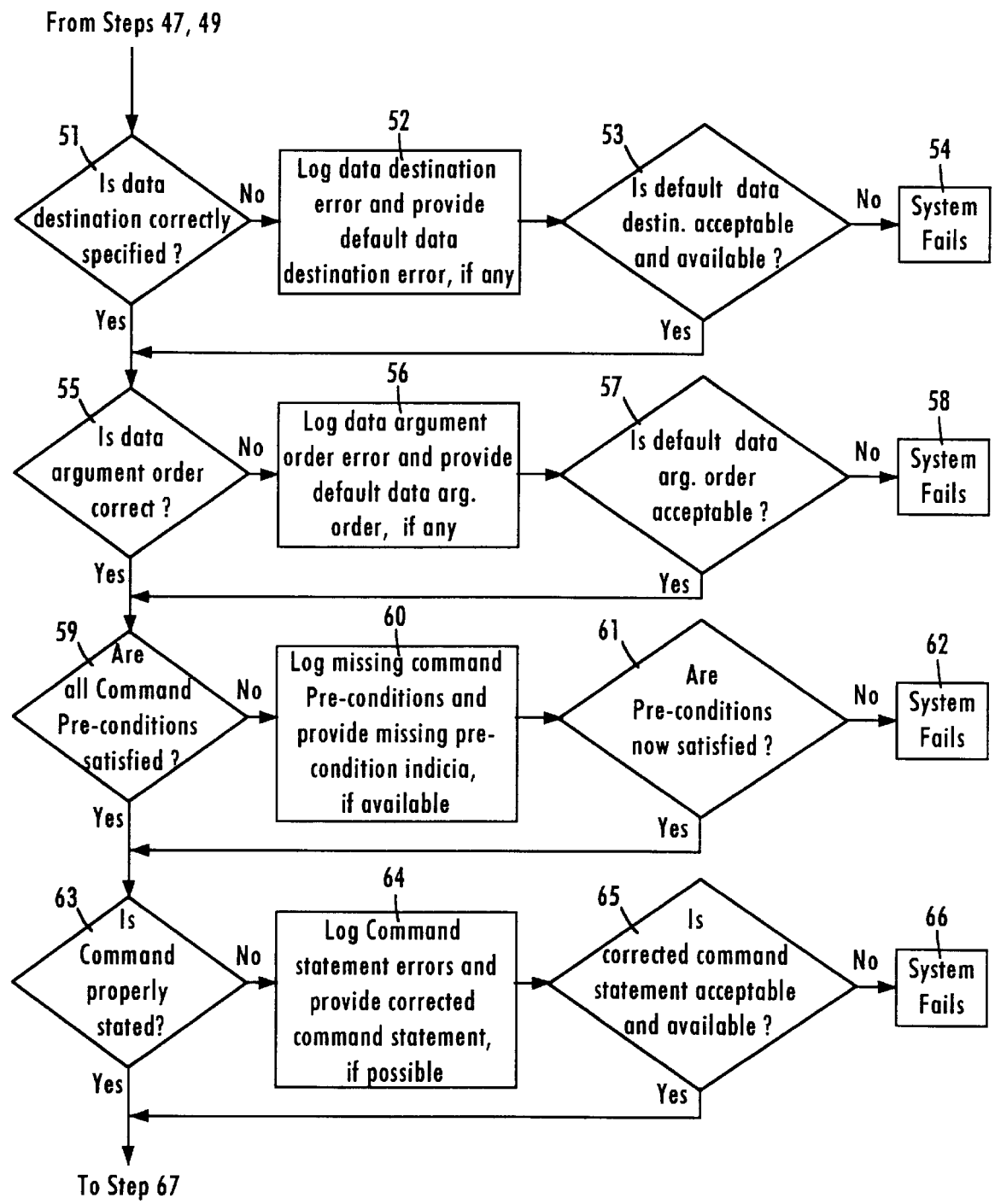
Figure 3C:
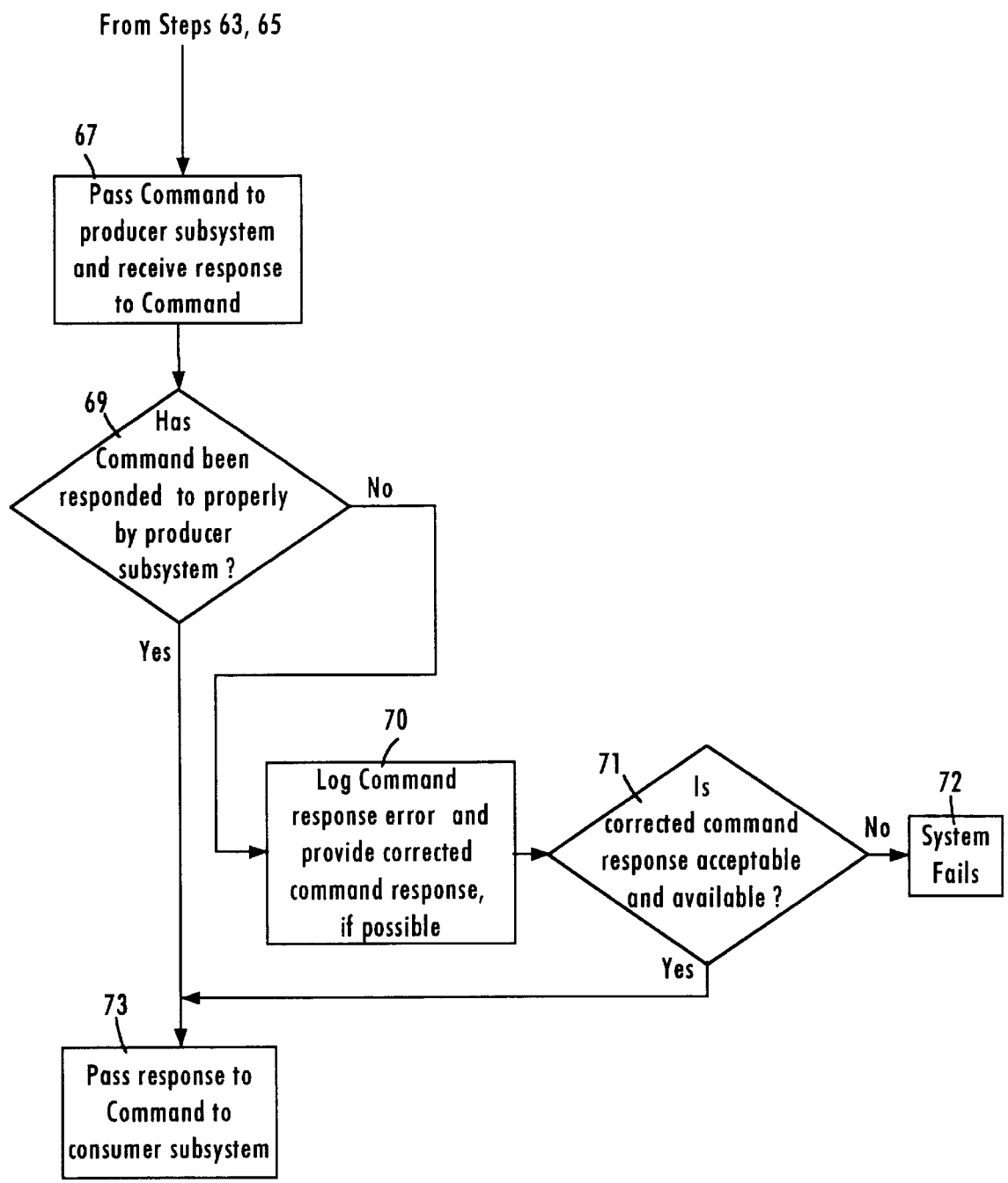

FIGS. 3A and 3B illustrate receipt by an interposer of a command from a consumer subsystem and performance of these interposer tasks on the command and command structure. In step 31, the interposer receives a command and determines if the data type of each command parameter is correct. If the answer is yes in step 31, the interposer proceeds to step 35. If the answer is no in step 31, the interposer logs the data type error and provides a default command parameter data type in step 32, if a default is available, and proceeds to step 33. In step 33, the interposer determines if a default command parameter data type is available and acceptable. If the answer is yes in step 33, the interposer proceeds to step 35. If the answer is no in step 33, the system fails, in step 34.

In step 35, the interposer receives a command and determines if the data argument size of each command parameter is correct. If the answer is yes in step 35, the interposer proceeds to step 39. If the answer is no in step 35, the interposer logs the data argument size error and provides a default command parameter data argument size in step 36, if a default is available, and proceeds to step 37. In step 37, the interposer determines if a default command parameter data argument size is available and acceptable. If the answer is yes in step 37, the interposer proceeds to step 39. If the answer is no in step 37, the system fails, in step 38.

In step 39, the interposer receives a command and determines if the data argument range of each command parameter is correct. If the answer is yes in step 39, the interposer proceeds to step 43. If the answer is no in step 39, the interposer logs the data argument range error and provides a default command parameter data argument range in step 40, if a default is available, and proceeds to step 41. In step 41, the interposer determines if a default command parameter data argument range is available and acceptable. If the answer is yes in step 41, the interposer proceeds to step 43. If the answer is no in step 41, the system fails, in step 42.

In step 43, the interposer receives a command and determines if the number of data arguments in the command is correct. If the answer is yes in step 43, the interposer proceeds to step 47. If the answer is no in step 43, the interposer logs the data argument number error and provides a default command parameter data argument number in step 44, if a default is available, and proceeds to step 45. In step 45, the interposer determines if a default command parameter data argument number is available and acceptable. If the answer is yes in step 45, the interposer proceeds to step 47. If the answer is no in step 45, the system fails, in step 46.

In step 47, the interposer receives a command and determines if the data source for the command is in range or otherwise correct. If the answer is yes in step 47, the interposer proceeds to step 51. If the answer is no in step 47, the interposer logs the data source error and provides a default data source in step 48, if a default is available, and proceeds to step 49. In step 49, the interposer determines if a default data source is available and acceptable. If the answer is yes in step 49, the interposer proceeds to step 51. If the answer is no in step 49, the system fails, in step 50.

In step 51, the interposer receives a command and determines if the data destination for the command is in range or otherwise correct. If the answer is yes in step 51, the interposer proceeds to step 55. If the answer is no in step 51, the interposer logs the data destination error and provides a default data destination in step 52, if a default is available, and proceeds to step 53. In step 53, the interposer determines if a default data destination is available and acceptable. If the answer is yes in step 53, the interposer proceeds to step 55. If the answer is no in step 53, the system fails, in step 54.

In step 55, the interposer receives a command and determines if the data argument order is correct. If the answer is yes in step 55, the interposer proceeds to step 59. If the answer is no in step 55, the interposer logs the data argument order error and provides a default command parameter data argument order in step 56, if a default is available, and proceeds to step 57. In step 57, the interposer determines if a default command data argument order is available and acceptable. If the answer is yes in step 57, the interposer proceeds to step 59. If the answer is no in step 57, the system fails, in step 58.

In step 59, the interposer receives a command and determines if all pre-conditions for execution of the command is present. If the answer is yes in step 59, the interposer proceeds to step 63. If the answer is no in step 59, the interposer logs the command pre-condition error and provides a default command pre-condition indicium (indicating that the subject pre-condition is now satisfied) in step 60, if a default is available, and proceeds to step 61. In step 61, the interposer determines if a default pre-condition indicium is available and acceptable. If the answer is yes in step 61, the interposer proceeds to step 63. If the answer is no in step 61, the system fails, in step 62.

In step 63, the interposer receives a command and determines if the command is properly stated; that is, if the command parameters are properly positioned and if all other requirements for proper command statement are complied with. If the answer is yes in step 63, the interposer proceeds to step 67. If the answer is no in step 63, the interposer logs the command statement error and provides a default command statement in step 64, if a default is available, and proceeds to step 65. In step 65, the interposer determines if a default command statement is available and acceptable. If the answer is yes in step 65, the interposer proceeds to step 67. If the answer is no in step 65, the system fails, in step 66.

In step 67, the interposer passes the command to the producer subsystem and receives a response to this command.

In step 69, the interposer receives a command response and determines if the command has been properly responded to by the producer subsystem. If the answer is yes in step 69, the interposer proceeds to step 73. If the answer is no in step 69, the interposer logs the command response error and provides a default response to the command in step 70, if a default is available, and proceeds to step 71. In step 71, the interposer determines if a default command response is available and acceptable. If the answer is yes in step 71, the interposer proceeds to step 73. If the answer is no in step 71, the system fails, in step 72.

Errors in the command are logged in steps 32, 36, 40, 44, 48, 52, 56, 60, 64 and 70, as part of the interposer consistency testing procedure. A command signal from a computer subsystem such as 11A, requesting data from another computer subsystem such as 11B or 11C, is "consistent" with the producer subsystem if none of the questions posed in steps 31, 35, 39, 43, 47, 51, 55, 59, 63 and 69 is answered in the negative. If at least one of these questions is answered in the negative, the system monitors for "compatibility" by (i) providing a default value, if possible, for the data attribute that is found to be not consistent (in steps 31, 35, 39, 43, 47, 51, 55, 59, 63 and 69), (ii) retesting for consistency of that data attribute, and (iii) accepting the default value of the data attribute in the interposer consistency testing procedure, if the corresponding question in step 31, 35, 39, 43, 47, 51, 55, 59, 63 and/or 69 is now answered in the affirmative. The interposer can test for consistency alone, can monitor for compatibility alone (e.g., by replacing a command signal data attribute by a default value and optionally testing for consistency for that data attribute), or can monitor and test for consistency and compatibility together.

A default value corresponding to an error logged in steps 32, 26, 40, 44, 48, 52, 56, 60, 64 and/or 70 are provided in these steps (if such a default value is available) and are checked for acceptability in the respective steps 33, 37, 41, 45, 49, 53, 57, 61, 65 and 71, as part of the interposer compatibility monitoring procedure. If the interposer determines that the system fails, in steps 34, 38, 42, 46, 50, 54, 58, 62, 66 and 72, because a default value is not available or is available but not acceptable, the corresponding error must be removed by human intervention. If no errors are found by the interposer, the system proceeds directly to step 73. If one or more errors occur but are removed by provision of an acceptable default value by the interposer, the system will proceed indirectly to step 73 and the interposer log will indicate what removable errors have occurred, for subsequent examination.

A change to an interface or to a directly communicating subsystem, as in A - - - B, may produce different forms of compatibility or incompatibility. First, if a feature or performance enhancement is added to, or changed on, the producer subsystem and has no effect on operation of the interface, and if the results of that change are invisible to a consumer subsystem, this change is compatible. Second, if a change is made that makes the new form of the interface incompatible with the preceding version, but through intervention the new interface version can be made compatible with the preceding interface version, the interface change is compatible, through intervention. In each of these two situations, an indicium indicating the version number, such as M.N, of the interface for the producer subsystem would be unchanged. Here, M represents a major version number and is incremented only when major changes are made to a subsystem, such as 21B, served by the interface; and N represents a sub-version number that may be incremented when substantial, but less dramatic, changes are made to that subsystem or to an interface that serves that subsystem.

Third, an interface change may be made that makes the new interface version incompatible with the preceding interface version, and either intervention is impossible or a decision is made not to provide intervention that would remove the incompatibility. This type of interface (or subsystem) change is characterized as incompatible. In this situation, an indicium indicating the version number would be changed from M.N to M.(N+1). If a new producer subsystem is installed, the version number would be changed from M.N to (M+1).N.

When a change to an interface, such as 23A/B in FIG. 2, is to be accounted for using an interposer, such as 25A/B, two methods of documenting and identifying these changes are available. In the first method, assume that the versions of the computer subsystems 21A and 21B are referred to as 21A.1 and 21B.1, respectively. If a first interposer 25A/B is to be inserted between the first subsystem 21A and the second subsystem 21B, the version of this first interposer is referred to as 25A/B.1. If a first supplemental interposer 25A/A/B is inserted between the first subsystem 21A and the first interposer 25A/B, to account for further changes made in the first subsystem 21A, the version of this first supplemental interposer would be referred to as 25A/B.2. This method offers self-contained referencing and notation, where only the version numbers of the interface and interposer(s) associated with the affected subsystem (here, 21A) are affected.

In a second method, when a first interposer 25A/B is inserted between the first subsystem 21A and the second subsystem 21B, the version numbers of the first interposer 25A/B and of the subsystem 21A become 21A.1 and 21A.2, respectively. If a first supplemental interposer 25A/A/B is inserted between the first subsystem 21A and the first interposer 25A/B, the version numbers of the first interposer 25A/B, the first supplemental interposer 25A/A/B and the first subsystem 21A become 21A.1, 21A.2 and 21A.3, respectively. This method offers the advantage that an interface and an interposer, once inserted, do not change their version numbers; the version number of the affected subsystem changes, and a newly inserted interposer receives a new version number.

In order to facilitate the loading of all modules, each target module has an associated string that identifies, by name, all the modules that must also be loaded because of the interdependencies of the target module on other modules. In the preceding example, the first subsystem 21A has a string that identifies the second subsystem 21B as a dependency. Because of this dependency, the second subsystem 21B is loaded whenever the first subsystem 21A is loaded. Where an interposer is inserted, compliance with several conditions is required. First, the presence of a new (changed) module, such as 21A, and the presence of an old (unchanged) module, such as 21B, causes an incompatibility or inconsistency that requires insertion of an interposer. The new module can be named 21A.1, and a new string associated with the old subsystem 21A will indicate a dependency between 21A and 21A.1. The following is a representative module loading sequence: (1) load module 21B and check for the dependencies between 21B and any other module; (2) this check reveals existence of a module named "21A," which now refers to an interposer module. The module 21A is now loaded, and its dependencies are checked, which reveals a module 21A.1. The module 21A.1 is now loaded, and this part of the loading sequence is complete.

Figure 4A:
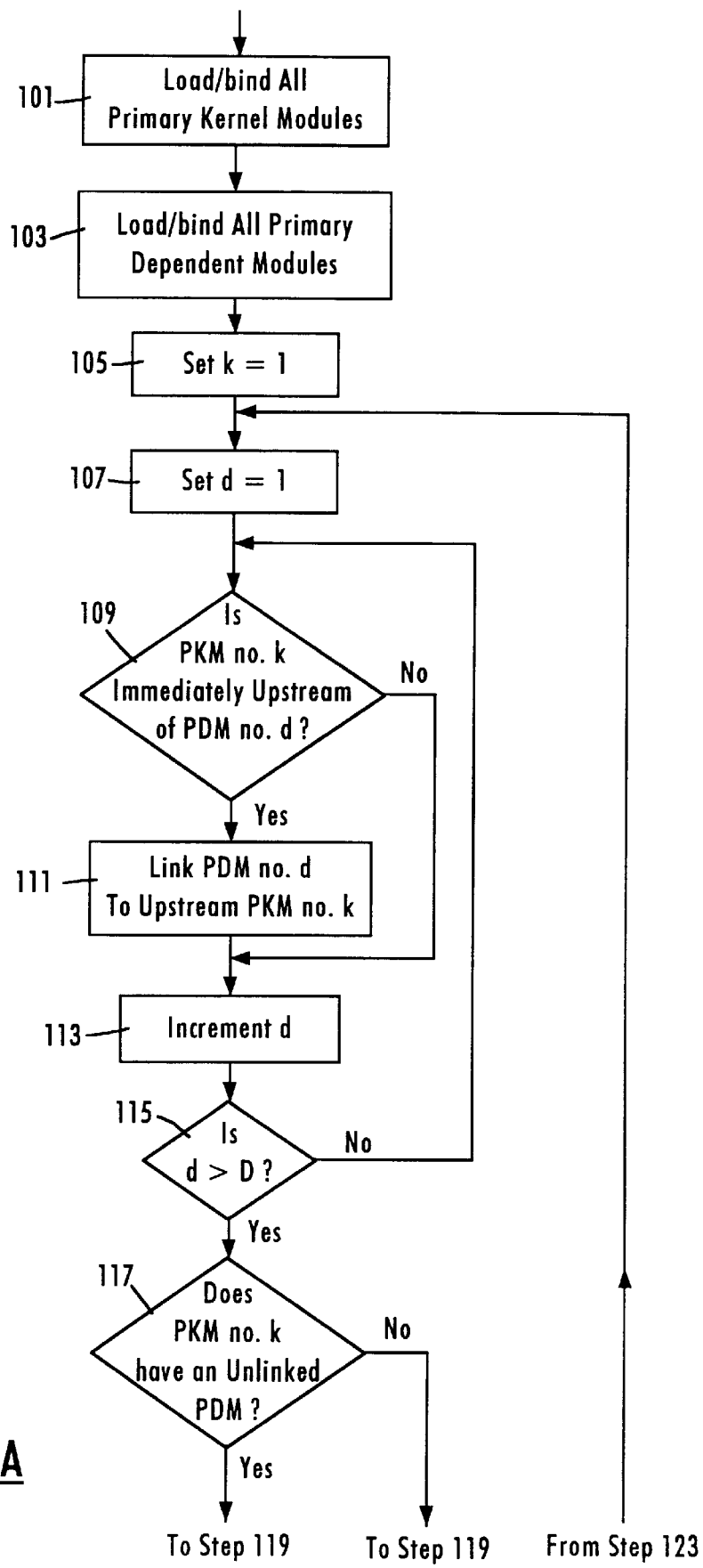
FIGS. 4A and 4B is a flow chart illustrating one approach for installing and linking computer subsystems and their associated interposers.
Figure 4B:
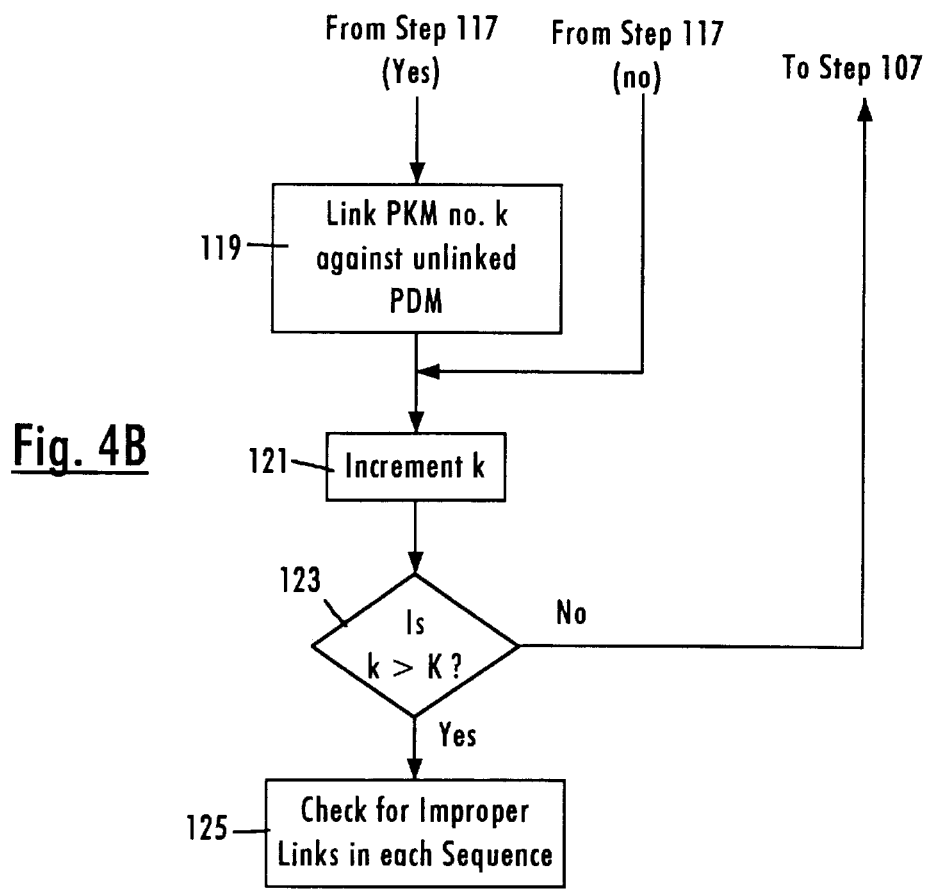

One method of installing a sequence of interposers is through use of loadable modules, where the installation procedures are indicated in FIGS. 4A and 4B. In step 101, each primary kernel module or PKM (subsystem and any associated interfaces, such as 21B, 23A/B and 23C/B) is loaded and bound into the system. The PKMs together form the primary kernel of the system and could include one or more platform-independent :modules (PIMs) and one or more platform-specific modules (PSMs). In step 103, all primary dependent modules PDMs (interposers) are loaded and bound into the system. The PKMs are numbered k=1, ..., K ($\geq 1$), and the PDMs are numbered d=1,...,D ($\geq 1$).

In step 105, the PKM number, k, is set equal to 1. In step 107, the PDM number, d, is set equal to 1. In step 109, PKM no. k is examined to determine if it is immediately upstream of PDM no. d. If the answer in step 109 is yes, PDM number d is linked to its associated upstream PKM number k, in step 111. In steps 113 and 115, the PDM number d is incremented (d=d+1), and the new value of d is compared to the maximum number D, before recycling to step 109. If the answer in step 109 is no, the PDM no. d is not linked to PKM number k, and the system proceeds directly to step 113.

Figure 5A:
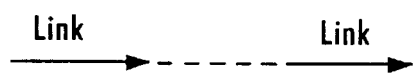
FIGS. 5A, 5B and 5C illustrate link situations that are to be avoided in any path representing communication between a sequence of primary kernel modules and primary dependent modules.
Figure 5B:
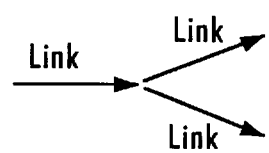
Figure 5C:
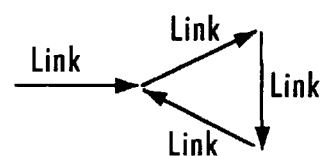

In step 117, the target PKM, number k, is examined to determine if the target PKM has any associated PDMs (interposers) for which no link has been made to the target PKM. If such an associated PDM enlists, this link is made, in step 119. In steps 121 and 123 in FIG. 4B, the PKM number, k, is incremented and compared to the maximum number K, before recycling to step 107. In step 125, each sequence of links representing a single path (e.g., A - - - B - - - D in FIG. 1), is checked to verify that (1) no breaks occur in the path occur, as where a link is not yet formed, (2) no two links have the same upstream or "source" end, and (3) no two links have the same downstream or "downstream" end (which would create a loopback). Each path is then represented by a single sequence of links with no absence of a needed link, as illustrated in FIG. 5A, with no branching of two or more links at a node, as illustrated in FIG. 5B, and with no loopbacks of links within this link sequence, as illustrated in FIG. 5C. The procedure shown in FIGS. 4A and 4B is applied to each PKM, as the source of all paths beginning at that PKM. Other link constraints can be added to the system and verified in step 125.

I claim:

1. Apparatus for providing flexible interfacing between a first computer subsystem, A, and a second computer subsystem, B, the apparatus comprising:

a subsystem interface IA/B, associated with the second computer subsystem B, positioned so that command signals generated by the first computer subsystem A, requesting data from the second computer subsystem B, will pass through and be processed by the second subsystem interface IA/B before being received by the second computer subsystem B, and any response signal generated by the second computer system subsystem B, responding to a command signal received from the first computer subsystem A, will pass through and be processed by the second subsystem interface IA/B before being received by the first computer subsystem A; and an interposer device, positioned between the first computer subsystem A and the second subsystem interface IA/B to receive said command signals from the first computer subsystem A, test the consistency of command signals with the second computer subsystem B, process said command signals and when they are inconsistent with the second computer subsystem B produce processed command signals consistent with said second computer subsystem B and to pass processed command signals to the second subsystem interface IA/B, wherein said second computer subsystem generates and transmits to said first computer subsystem A a response signal in response to receipt by said second computer subsystem B of said first command signal, and wherein said interposer device receives the response signal from said second computer subsystem and tests whether said first command signal has been properly responded to by the response signal received from said second computer subsystem B, before passing said response signal to said first computer subsystem A.

2. The apparatus of claim 1, wherein, when said interposer device determines that said first command signal has not been properly responded to by said second computer subsystem B, said interposer device provides a corrected response signal to replace said response signal that is not a proper response by said second computer subsystem B.

3. Apparatus for providing flexible interfacing between a first computer subsystem, A, and a second computer subsystem, B, the apparatus comprising:

a subsystem interface IA/B, associated with the second computer subsystem B, positioned so that command signals generated by the first computer subsystem A, requesting data from the second computer subsystem B, will pass through and be processed by the second subsystem interface IA/B before being received by the second computer subsystem B, and any response signal generated by the second computer system subsystem B, responding to a command signal received from the first computer subsystem A, will pass through and be processed by the second subsystem interface IA/B before being received by the first computer subsystem A;

an interposer device, positioned between the first computer subsystem A and the second subsystem interface IA/B to receive said command signals from the first computer subsystem A, test the consistency of command signals with the second computer subsystem B, process said command signals and when they are inconsistent with the second computer subsystem B produce processed command signals consistent with said second computer subsystem B and to pass processed command signals to the second subsystem interface IA/B, a subsystem interface IB/A, associated with said first computer subsystem A, positioned so that a command signal generated by said second computer subsystem B, requesting data from and being transmitted to, said first computer subsystem A, will pass through and be processed by the first subsystem interface IB/A before being received by said first computer subsystem A, and any response signal generated by said first computer subsystem A, responding to a command signal received from said second computer subsystem B, will pass through and be processed by the first subsystem interface IB/A before being received by said second computer subsystem B; and a second interposer device, positioned between the first subsystem interface IB/A and said second computer subsystem B.

4. A method for providing flexible interfacing between a first computer subsystem and a second computer subsystem, the method comprising the steps of:

providing a subsystem interface IA/B, associated with the second computer subsystem B, positioned so that command signals generated by the first computer subsystem A, requesting data from the second computer subsystem B, will pass through and be processed by the second subsystem interface IA/B before being received by the second computer subsystem B, and any response signal generated by the second computer subsystem B, responding to a command signal received from the first computer subsystem A, will pass through and be processed by the second subsystem interface IA/B before being received by the first computer subsystem A;

providing an interposer device, positioned between the first computer subsystem A and the second subsystem interface IA/B to receive said command signals from the first computer subsystem A, test the consistency of command signals with the second computer subsystem B, process said command signals when they are inconsistent with the second computer subsystem B produce processed command signals consistent with said second computer subsystem B and to pass processed command signals to the second computer subsystem interface IA/B, causing said second computer subsystem B to generate and transmit to said first computer subsystem A a response signal in response to receipt by said second computer subsystem B of said first command signal; and causing said interposer device to receive the response signal from said second computer subsystem B and to test whether said first command signal has been properly responding to by the response signal received from said second computer subsystem B, before passing said response signal to said first computer subsystem A.

5. The method of claim 4, further comprising the step of:

when said interposer device determines that said response signal has not been properly responded to by said second computer subsystem B, causing said interposer device to provide a corrected response signal to replace said response signal that is not a proper response by said second computer subsystem B.

6. A method for providing flexible interfacing between a first computer subsystem and a second computer subsystem, the method comprising the steps of:

providing a subsystem interface IA/B, associated with the second computer subsystem B, positioned so that command signals generated by the first computer subsystem A, requesting data from the second computer subsystem B, will pass through and be processed by the second subsystem interface IA/B before being received by the second computer subsystem B, and any response signal generated by the second computer subsystem B, responding to a command signal received from the first computer subsystem A, will pass through and be processed by the second subsystem interface IA/B before being received by the first computer subsystem A;

providing an interposer device, positioned between the first computer subsystem A and the second subsystem interface IA/B to receive said command signals from the first computer subsystem A, test the consistency of command signals with the second computer subsystem B, process said command signals when they are inconsistent with the second computer subsystem B produce processed command signals consistent with said second computer subsystem B and to pass processed command signals to the second computer subsystem interface IA/B, providing a subsystem interface IB/A, associated with said first computer subsystem A, positioned so that a command signal generated by said second computer subsystem B, requesting data from and being transmitted to, said first computer subsystem A, will pass through and be processed by the first subsystem interface IB/A before being received by said first computer subsystem A, and any response signal generated by said first computer subsystem A, responding to a command signal received from said second computer subsystem B, will pass through and be processed by the first subsystem interface IB/A before being received by said second computer subsystem B; and providing a second interposer device, positioned between the first subsystem interface IB/A and said second subsystem B.

7. A method of maintaining program compatibility when a version of one or more program modules changes, comprising the step of:

linking an interposer module between a first module and a second module to accommodate version differences;

wherein each said module maintains a symbol table and when a module does not contain an entry defining a symbol in the symbol table, checking a symbol table of at least one other module for a symbol definition.

8. The method of claim 7 in which said interposer module checks syntax.

9. The method of claim 8 in which said interposer module provides a different syntax when a call syntax presented to it is determined to be defective.

10. The method of claim 7 in which said interposer module checks whether preconditions for a call have been satisfied.

11. The method of claim 10 in which, when a precondition has not been satisfied, the interposer module attempts to satisfy the precondition.

12. The method of claim 7 in which said interposer module maintains a log of incompatible calls received and/or actions taken to resolve an incompatible call.

13. The method of claim 7 in which said interposer module is linked between said first module and said second module during testing or debugging.

14. The method of claim 7 in which the interposer module checks data calls for at least one of incorrect data type, data size, data range or order of data arguments.

15. The method of claim 14 in which the interposer module, when a data call is found to be incorrect, provides a different data call.

16. The method of claim 7 in which a plurality of interposer modules are linked between a module and a module interface.

17. The method of claim 7 in which one of said first and second modules is an interface module.

18. A method of maintaining program compatibility when a version of one or more program modules changes, comprising the steps of:

storing a list of changes made to at least one program module, providing an interposer module between said at least one program module and a second module, and checking calls between said at least one program module and said second module using said interposer module to determine compatibility using said list of changes.

19. The method of claim 18 further comprising the step of providing at least one alternative call when said interposer module determines that a call is incompatible.

20. A method of preparing program modules from at least one source of program modules for execution on a computer, comprising the steps of:

examining at least a first program module for a representation of names of other program modules that should be used with said at least one module, checking said at least one source of program modules for the presence of one or more interposer modules to be interposed between said first program module and one of said other program modules, and linking each interposer module found with said first program module.

21. The method of claim 20, further comprising the step of:

examining all modules linked for logical consistency of the relationship between modules and interposer modules.

22. A method of preparing program modules from at least one source of program modules for execution in a computer, comprising the steps of:

checking said at least one source of program modules for the presence of one or more interposer modules to be interposed between a first program module and a second program module, checking said at least one source of program modules for the presence of said first program module and said second program module, and if said first program module and said second program module are found, linking said one or more interposer modules between said first program module and said second program module.

23. The method of claim 22, further comprising the step of:

examining all modules linked for logical consistency of the relationship between modules and interposer modules.

* * * * *